(12) United States Patent
Albers et al.

(10) Patent No.: US 7,732,031 B1
(45) Date of Patent: Jun. 8, 2010

(54) STRIATED CARRIER

(75) Inventors: William Albers, Brattleboro, VT (US);
David Bacon, Keene, NH (US); Henry Gauthier, Brattleboro, VT (US);
Richard L. Kalich, Spofford, NH (US);
Pete Sucharzewski, Claremont, NH (US)

(73) Assignee: Vermed, Inc, Bellows Falls, VT (US)

( * ) Notice: Subject to any disclaimer, the term of this patent is extended or adjusted under 35 U.S.C. 154(b) by 0 days.

(21) Appl. No.: 11/130,777

(22) Filed: May 18, 2005

(51) Int. Cl.
*B32B 9/00* (2006.01)
*B32B 33/00* (2006.01)

(52) U.S. Cl. .................... 428/40.1; 428/42.1; 428/42.2; 428/42.3

(58) Field of Classification Search ................ 428/40.1, 428/42.1, 41.8, 42.2, 42.3, 156, 354
See application file for complete search history.

(56) References Cited

U.S. PATENT DOCUMENTS

| 5,087,494 | A |   | 2/1992  | Calhoun et al. ............... 428/40   |
| 5,273,805 | A | * | 12/1993 | Calhoun et al. ............. 428/156   |
| 5,344,681 | A |   | 9/1994  | Calhoun et al. ............... 428/41  |
| 5,589,246 | A |   | 12/1996 | Calhoun et al. ............. 428/120   |
| 5,888,650 | A |   | 3/1999  | Calhoun et al. ............. 428/354   |
| 6,689,441 | B1|   | 2/2004  | Kim ......................... 428/40.1  |

\* cited by examiner

*Primary Examiner*—Patricia L Nordmeyer
(74) *Attorney, Agent, or Firm*—Joanne M. Martin

(57) ABSTRACT

A system including multiple items releasably secured on a smooth carrier sheet having a plurality of, or groups of striations ranging in depth from 5 to 99 percent of the thickness of the carrier sheet. In one exemplary embodiment, a first group of striation includes a plurality of parallel striations oriented generally along one axis, and a second group of striations includes a plurality of parallel striation oriented generally along a second axis. During shipment, the adhesive retains sufficient traction to the carrier sheet by engaging the striations to substantially eliminate the lateral movement or sliding of the items from their original position on the carrier sheet. When removed from the carrier sheet, the adhesive releases from the carrier sheet and remains retained by the items even though the adhesive partially flowed into the carrier sheet striations.

11 Claims, 1 Drawing Sheet

STRIATED CARRIER

FIELD OF THE INVENTION

The present invention relates to a carrier system for releasably retaining articles thereon, in particular, a carrier system which includes striations on the surface of a carrier sheet or web to reduce or prevent lateral adhesive flow and article movement on said carrier.

BACKGROUND OF THE INVENTION

Small, lightweight, and particularly planar items are often manufactured in bulk and shipped affixed by an adhesive, to a carrier or liner sheet, typically having a release agent of silicone or similar substance to enable removability of the item. The individual item is selected by the user, and the adhesive releases from either the item or the carrier (or both), and removed from the carrier sheet by pulling the item away from the carrier sheet. Frequently, the items are formed as one segment die-cut from a sheet of multiply replicated items which are contiguous with each other, spaced only by the die cut, and offering some lateral support relative to each other while adhesively attached to the carrier sheet.

Over time, and especially in elevated temperatures and in transit, the adhesives, adhesive gels, etc., move or slip from their original position on the carrier sheet, and the item or items often move laterally on the surface of the carrier sheet, alone or together. In extreme conditions, the items may partially overhang the edge of the carrier sheet. Furthermore, the movement of the items on the surface of the carrier sheet makes removal of the items difficult, especially if marked and/or removed by automated systems, e.g. laser printer applicators, pick-and-place and label applicators, etc., or simply suggests that the items may be inferior simply due to visual misalignment, resulting in waste or scrap items.

SUMMARY OF THE INVENTION

The present invention typically comprises a smooth, substantially planar carrier sheet having a plurality of striations or groups of striations ranging in depth from 5 to 99 percent of the thickness of the carrier sheet separated by a portion of the planar carrier sheet. In one embodiment, a first group of striation includes a plurality of parallel striations oriented generally along or parallel to one axis, and a second group of striations includes a plurality of parallel striation oriented generally along or parallel to a second axis which is oblique, if not perpendicular, to the first axis.

A sheet of multiple replicas of an item to be secured on the carrier sheet is prepared, and an adhesive is applied over the region of the sheet of multiple replicas on the carrier sheet or on the sheet of multiple replicas (or items) themselves, and the sheets are mated. The sheet of multiple replicas are typically then die-cut to substantially separate each of the item replicas, and the entire system of carrier sheet, multiple items, and retaining adhesive is ready for packaging and shipment.

During shipment, the adhesive retain sufficient traction on the carrier sheet by flowing into or otherwise engaging the striations to substantially eliminate the movement or sliding of the items from their original position. When removed from the carrier sheet, the adhesive releases from the carrier sheet and remains retained by the items even though the adhesive partially flowed into the carrier sheet striations.

Further embodiments include different striation patterns, different items and different disposition of release agents or carrier sheet materials.

BRIEF DESCRIPTION OF THE DRAWING

These and further features of the present invention will be better understood by reading the following Detailed Description together with the Drawing, wherein.

DETAILED DESCRIPTIONS OF THE INVENTION

Figure 1:
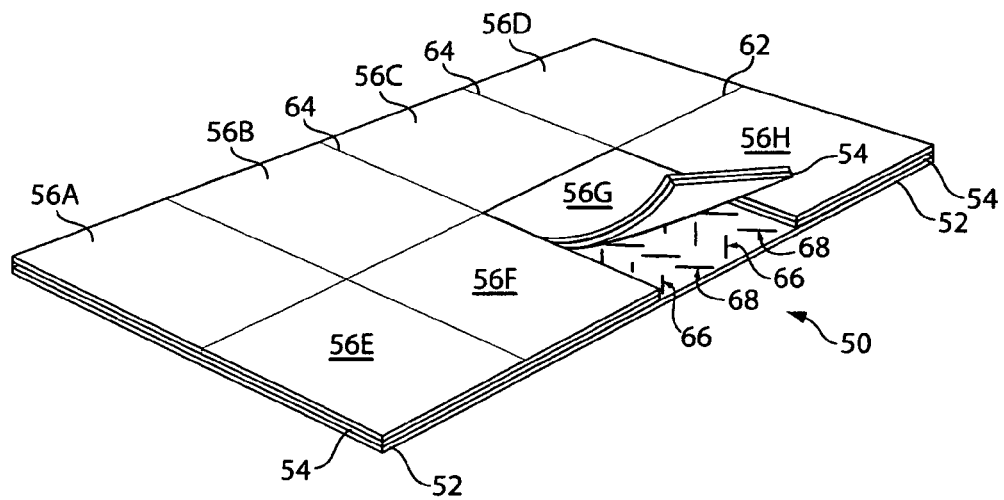
FIG. 1 is a perspective view of one embodiment of the present invention having planar die-cut items retained by a scored carrier sheet.

A typical embodiment 50 according to the present invention is shown in FIG. 1, wherein a plurality of die-cut items 56A-56H are releasably retained on the carrier sheet 52 with an adhesive layer 54. In the embodiment 50, the contiguous (but separate) items 56A-56H are formed from a common sheet and die-cut therethrough at 62 and orthogonal cut lines 64 to form the items 56A -56H. The adhesive layer 54 is deposited on the items 56A-56H prior to die-cut, but may alternatively be applied to the carrier sheet 52 before the uncut sheet of items 56A-56H is applied thereon. The carrier sheet typically comprises paper, synthetic paper, polymers, foam, cloth, tape, plastic or any other suitably stiff material that can accept the striations, and may optionally include a release layer (not shown) such as silicone or other known adhesive release material applied thereon and on which the adhesive 54 is received. The adhesive 54 includes non-solid adhesives and adhesive gels which are sufficiently fluid to enter into the striations and are non-permanently bonding to the carrier sheet or release layer thereon, so as to permit removal therefrom, yet bond to the items (e.g. 56A-56H).

According to the present invention, the carrier sheet 52 has striations formed, cut, scored, embossed, impregnated, etc. therein, having a relative depth of 5 to 99 percent (or more) of the thickness of the carrier sheet, generally limited only by what would keep the striations on the non-adhesive surface from breaking through or opening in normal handling, and thus preventing the adhesive from flowing through the carrier sheet and adhering to the surface of the underlying material's surface. In particular, in the exemplary embodiment of FIG. 1, the striations comprise two different groups, 66 and 68, each comprising a plurality of parallel striations of a length a fraction of the planar (length or width) dimension of the item (e.g. 56G). In the embodiment 50 of FIG. 1, the striations of each of the groups 66, 68 is non-parallel, preferably oblique and even perpendicular, with the constituent striations of the other of the group 68 or 66. The striations 66, 68 are revealed beneath the upraised, partially detached item 56G, but are also present under releasable items 56a-56F, 56H, but not viewable in the view of FIG. 1. The non-parallel nature of the groups of striations permits the adhesive to flow into the striations 66, 69 and provide retention of the items 56A-56H to maintain registration with the underlying carrier sheet 52, even in transport under adverse conditions (e.g. vibration, heat, humidity, upright disposition of the carrier sheet 52, etc. from which the items 56A-56H are ultimately released upon detachment by the user. Other striation patterns according to the present invention may be more or less complex, and include striation portions having a variety of directions, so as to best resist item movement in any direction on the carrier sheet.

Figure 2:
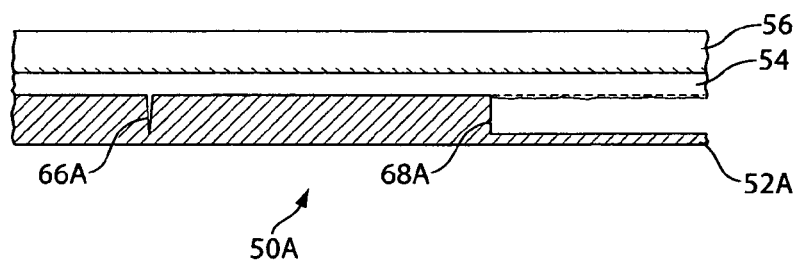
FIG. 2 is an elevation view of a portion of the embodiment of FIG. 1, showing the striations in greater detail.

An enlarged cross-sectional view 50A of the embodiment 50 is shown in FIG. 2, wherein the embodiment 50 is bisected along the axis of one of the striations (e.g. 68) to show an elongated striation 68A into the carrier 52A. A nearby striation 66A, being oblique and nearly perpendicular to the striation 68A, is shown with a smaller horizontal dimension having facing side walls each with a top edge contiguous with a surface of said carrier sheet and each with a bottom edge being contiguous with facing side wall. In either striation 66A and 68A, the adhesive 54 flows into each striation providing sufficient anchoring to substantially eliminate adhesive lateral flow or item 56 movement until removed by the user. Typically, the number, pattern, depth and placement of the striations under the item retained thereon are determined by the mass of the item carried thereon and the adhesive and release agent used. For small, heavy items or slippery release agents, at least the number, pattern length and amounts of perpendicular component, and/or depth of the striations are increased.

Modification and substitutions by one of ordinary skill in the art are within the scope of the present invention which is not to be limited except by the claims which follow.

What is claimed is:

1. A carrier system for releasably retaining an item thereon, comprising:
   a carrier sheet having a pattern of striations therein having substantially parallel facing side walls each with a top edge contiguous with a substantially planar surface of said carrier sheet and each with a bottom edge being contiguous with said facing side wall; and
   an adhesive disposed thereon to communicate and engage with said pattern of striations to receive said item and releasably retain said item to said carrier sheet providing a system having at least one of substantially eliminated lateral flow between said adhesive and said carrier, and substantially eliminated lateral item movement on said carrier until manually removed.

2. The carrier system of claim 1, wherein said adhesive comprises a releasable adhesive, wherein said item is releasably retained to said carrier sheet.

3. The carrier system of claim 1, wherein at least a portion of said striations are disposed in a parallel pattern.

4. The carrier system of claim 3, wherein said striations in said parallel pattern are oriented along a first axis, said striations further comprising at least a portion oriented in a pattern having a direction component along a second axis oblique to said first axis.

5. The carrier system of claim 1, wherein said item comprises length and width dimensions, wherein the length and width of the pattern of said striation being less than at least one of said length and width of said item.

6. The carrier system of claim 1, wherein said striations comprises at least one of formed, scored, embossed and impregnated indentations into said carrier sheet.

7. The carrier system of claim 6, wherein said indentations comprise cuts into the material of said carrier sheet.

8. The carrier system of claim 6, wherein said indentations have a depth into said carrier sheet of 5-99 percent of the thickness of said carrier sheet.

9. The carrier system of claim 1, wherein the carrier comprises one of paper, synthetic paper, polymer foam, cloth and tape, wherein the adhesive is retained on the item upon removal of said item from the carrier.

10. The carrier system of claim 1, wherein said carrier sheet includes a release layer thereon disposed to receive said adhesive thereon, for facilitating release of said adhesive from said carrier sheet as said item is pulled away from said carrier sheet.

11. A carrier system for releasably retaining an item thereon, comprising:
   a substantially planar carrier sheet having a pattern of cut striations therein forming substantially parallel facing contiguous sidewalls and having at least a portion of a planar surface therebetween; and
   an adhesive disposed thereon and sufficiently fluid to enter into and disposed to engage said side walls of said pattern of cut striations to receive said item and retain said item to said carrier sheet.

* * * * *